(12) United States Patent
Miyoshi

(10) Patent No.: US 11,836,406 B1
(45) Date of Patent: Dec. 5, 2023

(54) INFORMATION PROCESSING APPARATUS, PRINTING APPARATUS, PRINTING SYSTEM, MEDIUM, AND PRINTING CONTROL METHOD

(71) Applicant: CANON KABUSHIKI KAISHA, Tokyo (JP)

(72) Inventor: Tomoya Miyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/304,495

(22) Filed: Apr. 21, 2023

(30) Foreign Application Priority Data

Jun. 9, 2022 (JP) ................................ 2022-093819

(51) Int. Cl.
*G06F 3/12* (2006.01)
(52) U.S. Cl.
CPC .......... *G06F 3/1238* (2013.01); *G06F 3/1222* (2013.01); *G06F 3/1267* (2013.01)
(58) Field of Classification Search
None
See application file for complete search history.

(56) References Cited

U.S. PATENT DOCUMENTS

| 8,675,234 B2 | 3/2014 | Sato | |
|---|---|---|---|
| 9,436,423 B2 | 9/2016 | Doui | |
| 2004/0196491 A1* | 10/2004 | Uchino | G06F 3/1238 358/1.15 |
| 2008/0313634 A1 | 12/2008 | Matsueda | |
| 2014/0002847 A1* | 1/2014 | Mizuno | G06K 15/4095 358/1.14 |
| 2014/0320883 A1 | 10/2014 | Ichida | |
| 2014/0337445 A1 | 11/2014 | Nishida | |

(Continued)

FOREIGN PATENT DOCUMENTS

| JP | 2012133489 A | 7/2012 |
|---|---|---|
| JP | 2015001787 A | 1/2015 |

OTHER PUBLICATIONS

Miyoshi. Copending U.S. Appl. No. 18/304,547, filed Apr. 21, 2023.
(Continued)

*Primary Examiner* — Lennin R Rodriguezgonzalez
*Assistant Examiner* — Lennin R Rodriguez
(74) *Attorney, Agent, or Firm* — ROSSI, KIMMS & McDOWELL LLP

(57) ABSTRACT

An information processing apparatus is provided. The apparatus transmits, to a printing apparatus, attribute information regarding a designated print job, out of at least one print job registered together with attribute information, in response to a request, from the printing apparatus, for the attribute information regarding the designated print job, receives a job fetch request from the printing apparatus together with password information input to the printing apparatus in accordance with a password attribute included in the attribute information, verifies the received password information with a value of the password attribute included in the attribute information regarding the designated print job, and transmits the designated print job and the attribute information regarding the designated print job to the printing apparatus if the verification is successful.

14 Claims, 10 Drawing Sheets

(56) References Cited

U.S. PATENT DOCUMENTS

| | | |
|---|---|---|
| 2015/0172267 A1 | 6/2015 | Sato |
| 2016/0004483 A1 | 1/2016 | Yamakawa |
| 2020/0183628 A1 | 6/2020 | Boo et al. |
| 2021/0165616 A1 | 6/2021 | Yasuda |

OTHER PUBLICATIONS

Extended European Search Report issued in European Appln. No. 23169113.0 dated Oct. 25, 2023.
Extended European Search Report issued in European Appln. No. 23169111.4 dated Oct. 23, 2023.

\* cited by examiner

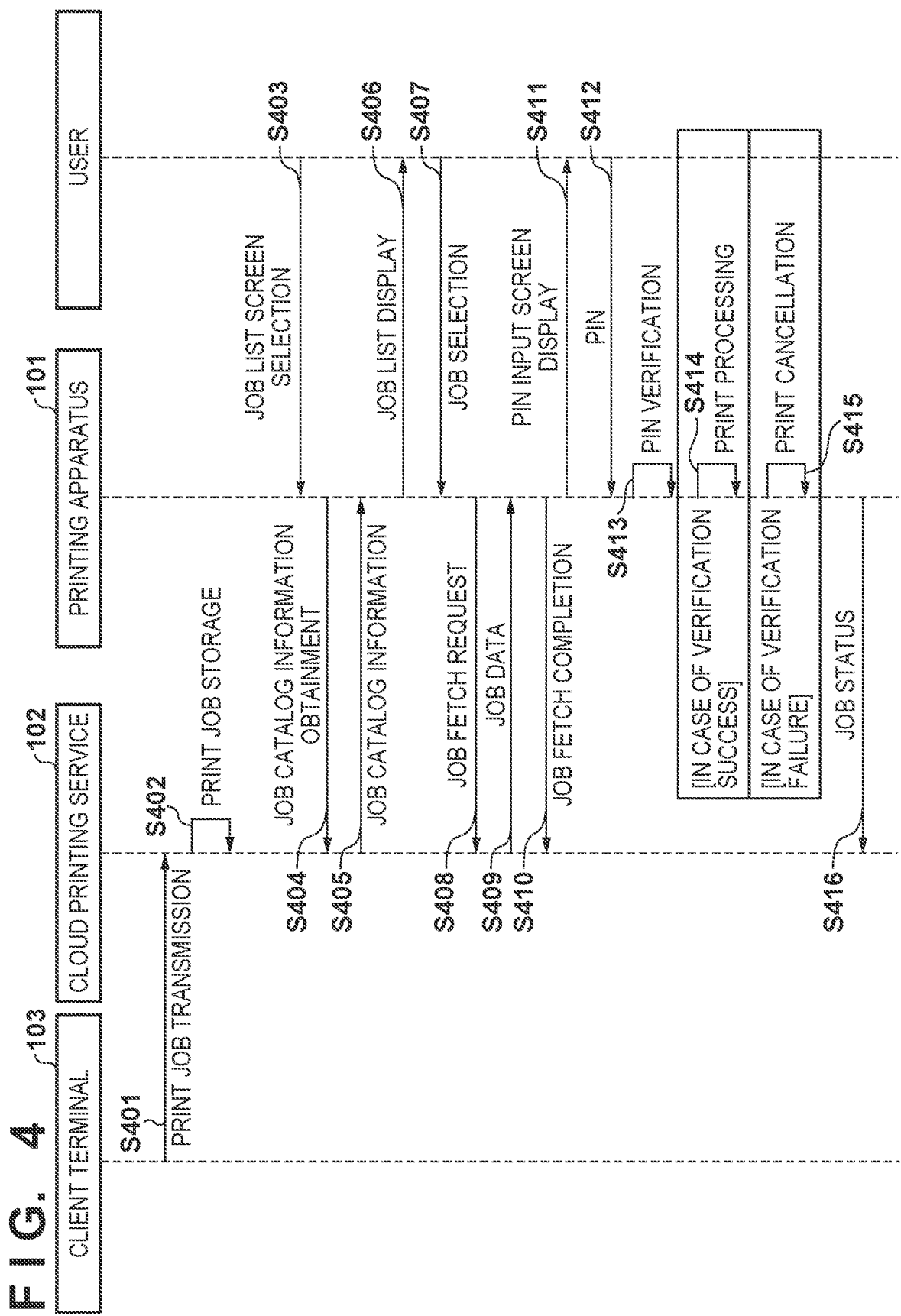

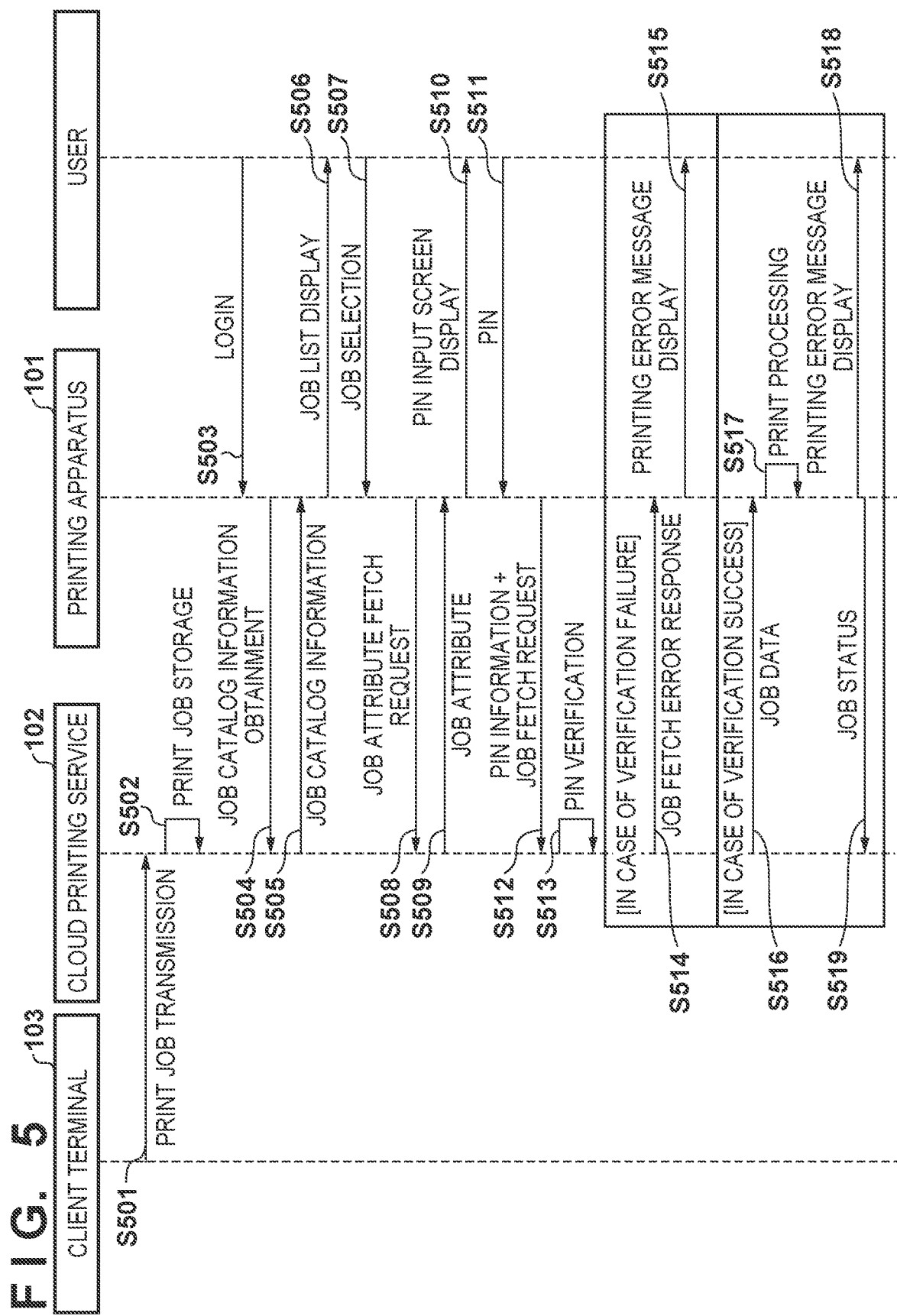

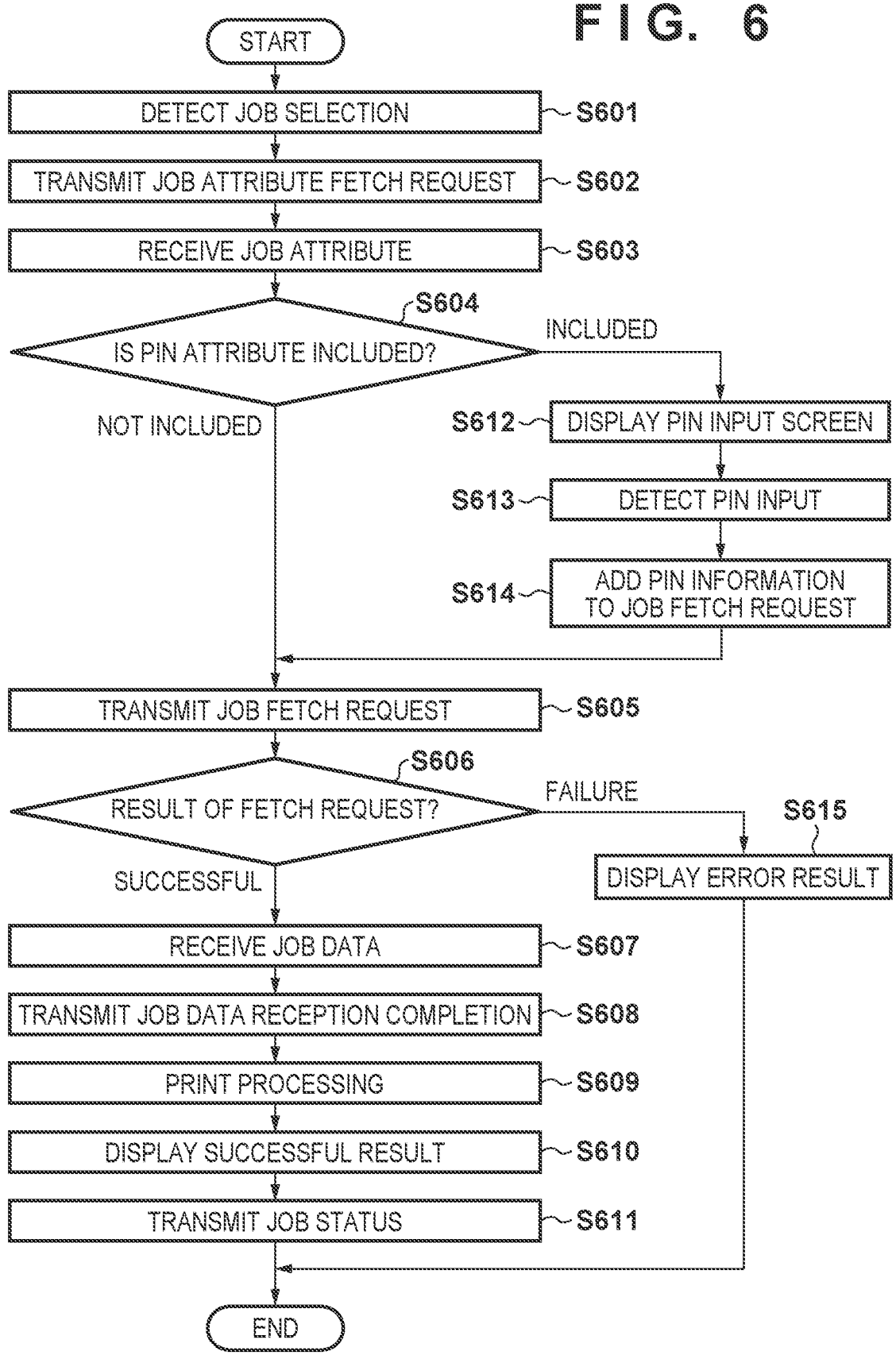

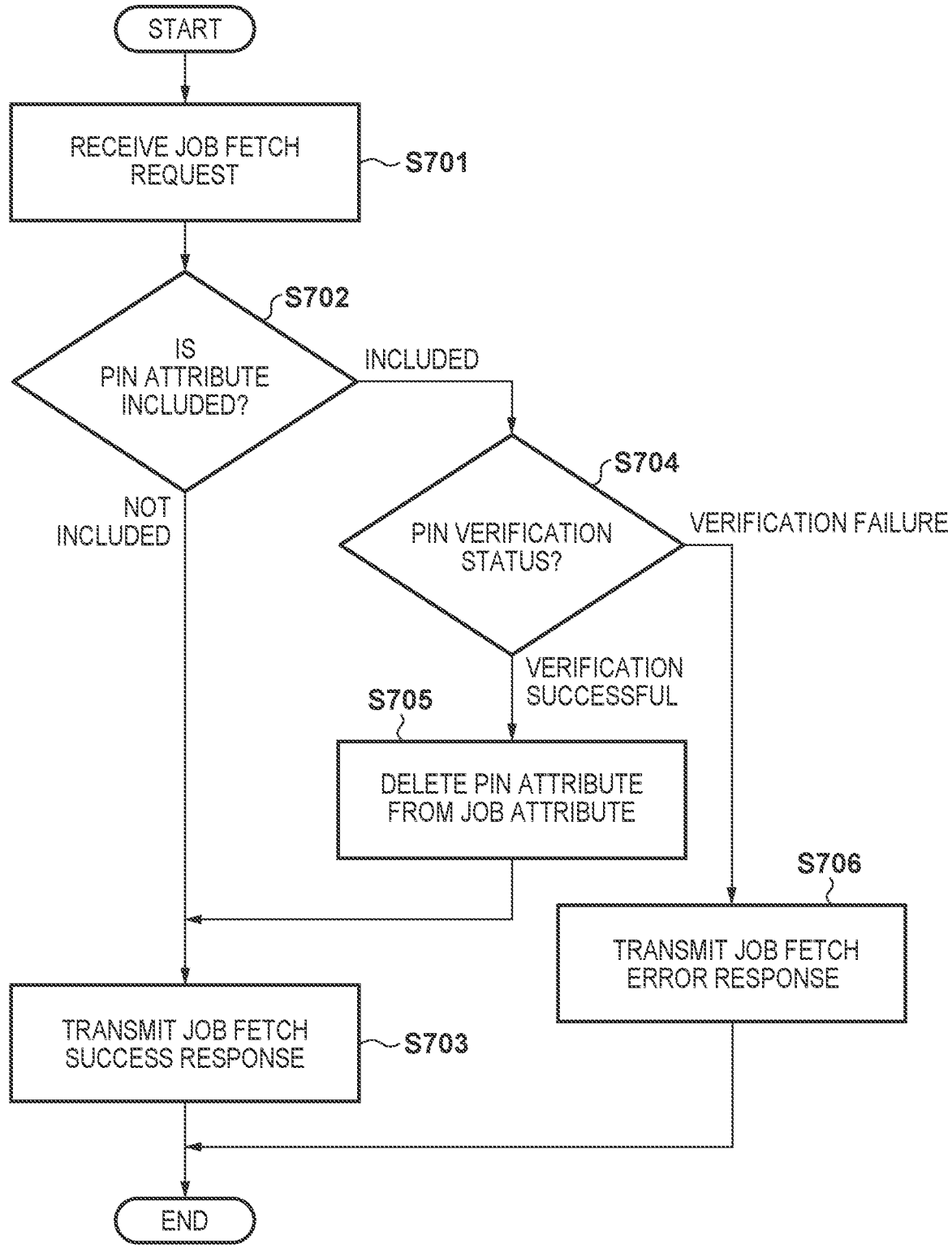

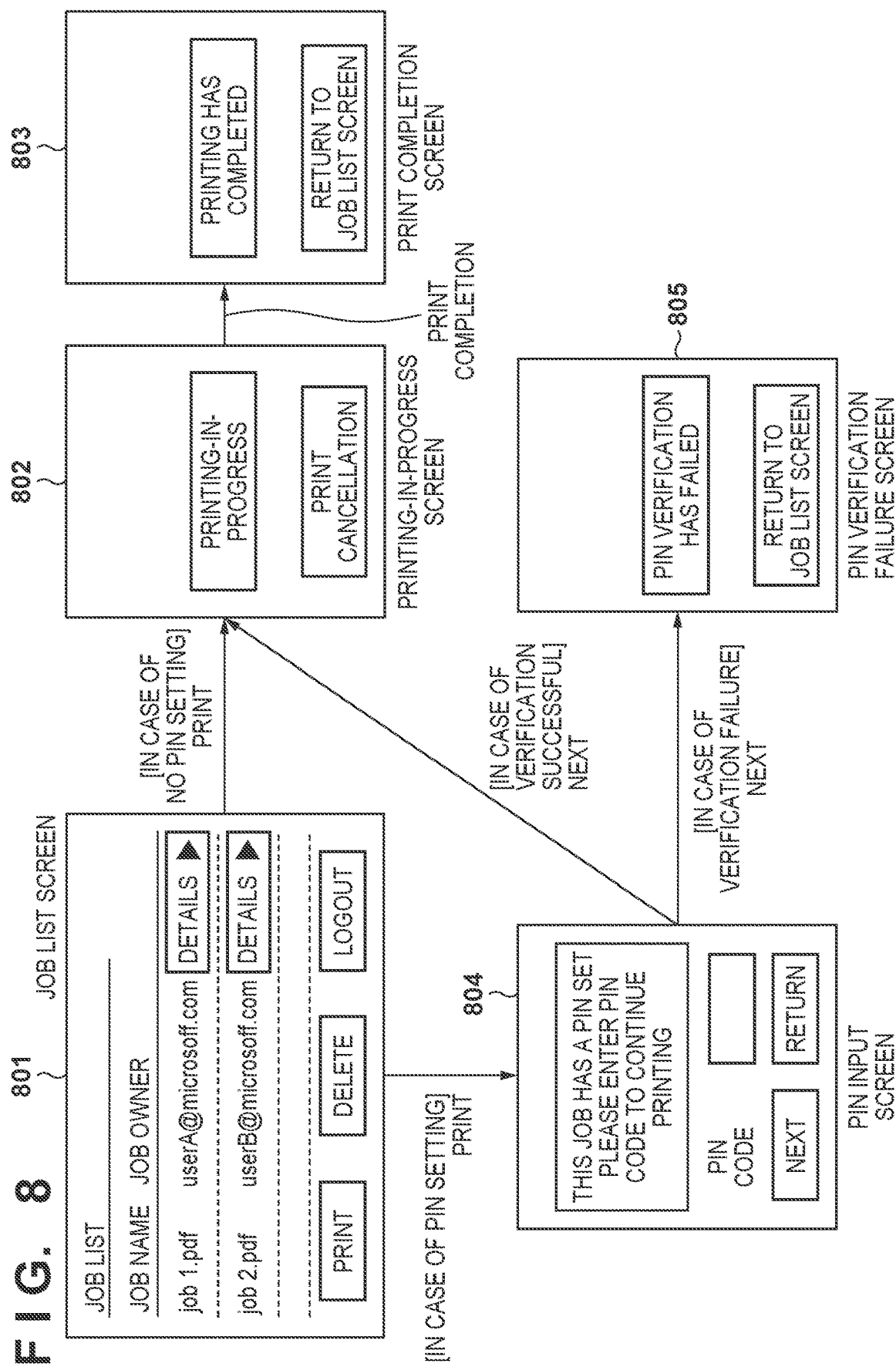

FIG. 9A

JOB FETCH REQUEST PACKET
(IN CASE WHERE PIN INFORMATION IS NOT INCLUDED)

Operation : Fetch-Job Request
Attribute:
    job-id=1

FIG. 9B

JOB FETCH REQUEST PACKET
(IN CASE WHERE PIN INFORMATION IS INCLUDED)

Operation : Fetch-Job Request
Attribute:
    job-id=1
    job-password=ace342bda1x
    job-password-encryption=sha2-256

FIG. 9C

JOB FETCH RESPONSE PACKET (IN CASE OF SUCCESS)

Operation : Fetch-Job Response
Status code : successful-ok
Attribute:
    job-id=1
    job-uuid=urn:uuid:ce027bf-4d49-32c3-47db-054116c684fb
    job-name=test1.pdf
    job-originating-user-name : userA
    job-originating-user-uri : userA@microsoft.com
    copies=1
    number-up=1
    color-mode=color
Payload:
    data...

FIG. 9D

JOB FETCH RESPONSE PACKET (IN CASE OF FAILURE)

Operation : Fetch-Job Response
Status code : client-error-not-accept

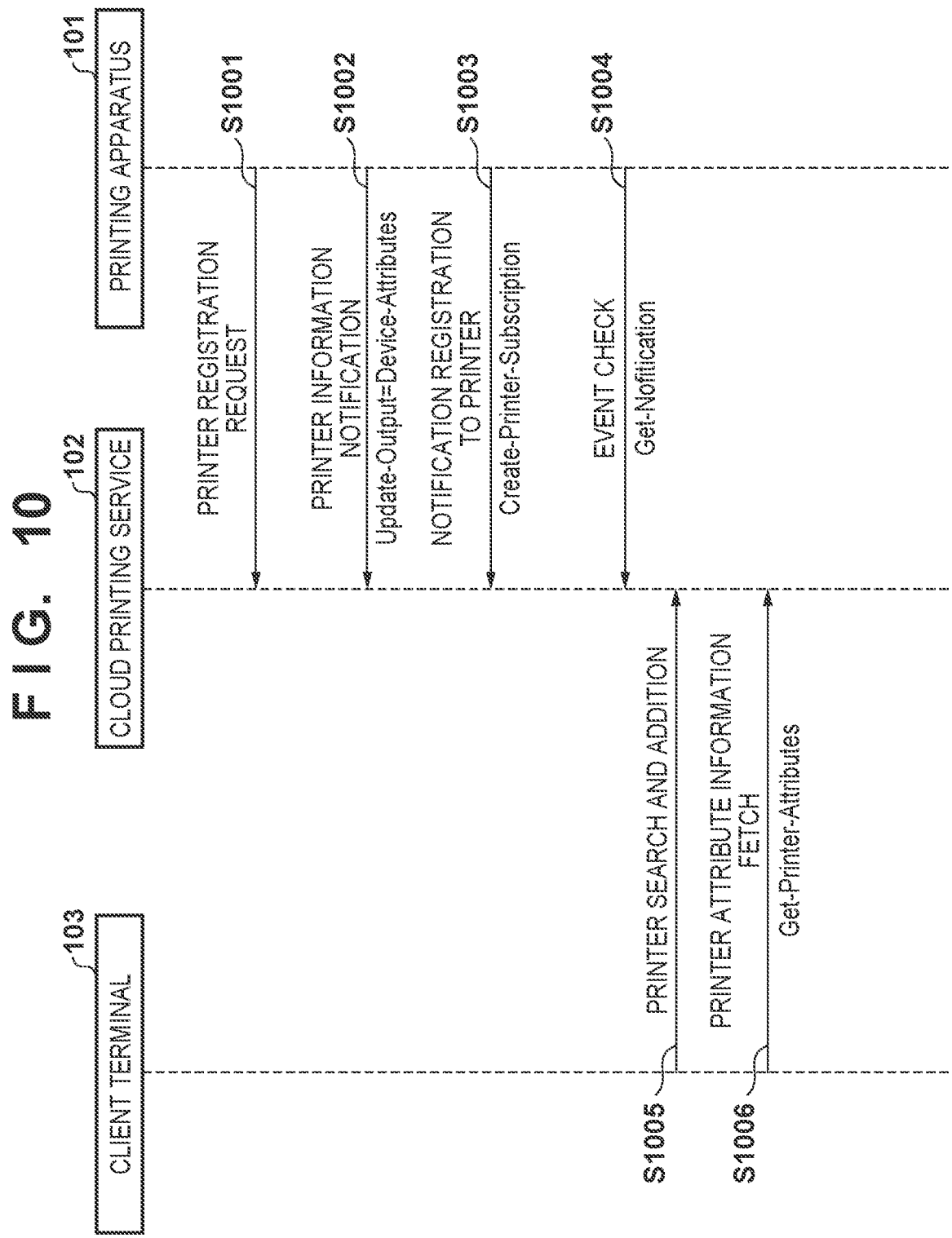

INFORMATION PROCESSING APPARATUS, PRINTING APPARATUS, PRINTING SYSTEM, MEDIUM, AND PRINTING CONTROL METHOD

BACKGROUND OF THE INVENTION

Field of the Invention

The present invention relates to an information processing apparatus, a printing apparatus, a printing system, a medium, and a printing control method.

Description of the Related Art

In recent years, the mechanism of cloud printing, in which a print job is submitted via a cloud and transmitted to a printing apparatus, has begun to be widely used (Japanese Patent Laid-Open No. 2012-133489). In this type of printing system, first, an administrator registers a printing apparatus to a cloud printing service (hereinafter also referred to as "CPS") to which the administrator belongs. Thereafter, users who are permitted to use the CPS use respective client terminals to select a printer registered in the CPS as an output printer, configure desired print settings, and transmit a print job to the CPS. The CPS that has received a print job transfers this print job to the printing apparatus. The printing apparatus executes printing based on the transferred print job. Particularly, the mechanism of cloud printing that uses Internet Printer Protocol (IPP) is defined by PWG5100.18, RFC3995, RFC3996, and other relevant specifications.

Also, PWG5100.11 and other specifications define PIN printing methods that use IPP. If a personal identification number (PIN) code for a print job to be subjected to PIN printing is input from a client terminal, the print job is transmitted together with the PIN to the CPS. Upon receiving a request for the print job from the printing apparatus that has been notified of the presence of the print job by an event notification from the CPS, the CPS stores PIN information in a job-password or job-password-encryption attribute and transmits the PIN information together with print data to the printing apparatus. When the printing apparatus performs printing, the printing apparatus executes the print job if preset PIN information matches.

In the case of combining a CPS with PIN printing, a user inputs a PIN code from a client terminal, and print data and PIN information are transmitted to the CPS. The CPS stores the received print data and PIN information. Upon receiving a print job fetch request from the printing apparatus, the CPS transmits the stored print data and PIN information to the printing apparatus. The user inputs preset PIN information from an operation unit of the printing apparatus, and printing can be performed if the PIN code matches.

If the user has forgotten PIN code information at this time, the PIN check on the printing apparatus fails. Then, the user performs processing to cancel the print job on the printing apparatus, for example. In this case, the print job has already been transmitted to the printing apparatus, and therefore, traffic for print data has been generated between the CPS and the printing apparatus. In the case of a pay-as-you-go cloud service, the problem arises in that the traffic for the print data for which a PIN check has failed is wasted.

SUMMARY OF THE INVENTION

The present invention provides a mechanism for efficiently transferring print data in the case of PIN printing.

The present invention has the following configuration. The present invention in its first aspect provides an information processing apparatus comprising: at least one memory that stores at least one program, and at least one processor, wherein the at least one program causes the at least one processor to perform operations including: transmitting, to a printing apparatus, attribute information regarding a designated print job, out of at least one print job registered together with attribute information, in response to a request, from the printing apparatus, for the attribute information regarding the designated print job; receiving a job fetch request from the printing apparatus together with password information input to the printing apparatus in accordance with a password attribute included in the attribute information; verifying the received password information with a value of the password attribute included in the attribute information regarding the designated print job; and transmitting the designated print job and the attribute information regarding the designated print job to the printing apparatus if the verification performed by the verifying is successful.

The present invention in its second aspect provides a printing apparatus comprising: at least one memory that stores at least one program, and at least one processor, wherein the at least one program causes the at least one processor to perform operations including: transmitting, to an information processing apparatus, a request for attribute information regarding a print job designated from at least one print job registered in the information processing apparatus; accepting input of password information that is made by a user if attribute information transmitted in response to the request for the attribute information includes a password attribute; and transmitting, to the information processing apparatus, a job fetch request together with the input password information if the password attribute has been received for the designated print job, wherein if a print job is received in response to the job fetch request transmitted together with the password information, printing is performed by a printing unit based on data regarding the print job.

The present invention in its third aspect provides a printing system comprising: the information processing apparatus; and the printing apparatus, wherein the information processing apparatus comprises: at least one memory that stores at least one first program, and at least one first processor, wherein the at least one first program causes the at least one first processor to perform operations including: transmitting, to a printing apparatus, attribute information regarding a designated print job, out of at least one print job registered together with attribute information, in response to a request, from the printing apparatus, for the attribute information regarding the designated print job; receiving a job fetch request from the printing apparatus together with password information input to the printing apparatus in accordance with a password attribute included in the attribute information; verifying the received password information with a value of the password attribute included in the attribute information regarding the designated print job; and transmitting the designated print job and the attribute information regarding the designated print job to the printing apparatus if the verification is successful, and the printing apparatus comprises: at least one memory that stores at least one second program, and at least one second processor, wherein the at least one second program causes the at least one second processor to perform operations including: transmitting, to an information processing apparatus, a request for attribute information regarding a print job designated from at least one print job registered in the information processing apparatus; accepting input of password information that is made by a user if attribute information transmitted in response to the request for the attribute information includes a password attribute; and transmitting, to the information processing apparatus, a job fetch request together with the input password information if the password attribute has been received for the designated print job, wherein if a print job is received in response to the job fetch request transmitted together with the password information, printing is performed by a printing unit based on data regarding the print job.

The present invention in its fourth aspect provides a non-transitory computer readable medium storing thereon a program which, when loaded into a computer and executed, causes the computer to execute a process, the process comprising: transmitting, to a printing apparatus, attribute information regarding a designated print job, out of at least one print job registered together with attribute information, in response to a request, from the printing apparatus, for the attribute information regarding the designated print job; receiving a job fetch request from the printing apparatus together with password information input to the printing apparatus in accordance with a password attribute included in the attribute information; verifying the received password information with a value of the password attribute included in the attribute information regarding the designated print job; and transmitting the designated print job and the attribute information regarding the designated print job to the printing apparatus if the verification is successful.

The present invention in its fifth aspect provides a non-transitory computer readable medium storing thereon a program which, when loaded into a computer and executed, causes the computer to execute a process, the process comprising: transmitting, to an information processing apparatus, a request for attribute information regarding a print job designated from at least one print job registered in the information processing apparatus; accepting input of password information that is made by a user if attribute information transmitted in response to the request for the attribute information includes a password attribute; and transmitting, to the information processing apparatus, a job fetch request together with the input password information if the password attribute has been received for the designated print job, wherein if a print job is received in response to the job fetch request transmitted together with the password information, printing is performed by a printing unit based on data regarding the print job.

The present invention in its sixth aspect provides a printing control method to be performed by a printing system that includes an information processing apparatus, a printing apparatus, and a terminal, the method comprising: transmitting, to the information processing apparatus, a request for attribute information regarding a print job designated from at least one print job registered in the information processing apparatus, with use of the printing apparatus; transmitting the attribute information regarding the designated print job to the printing apparatus in response to the request for the attribute information, with use of the information processing apparatus; accepting input of password information that is made by a user if the attribute information transmitted in response to the request for the attribute information includes a password attribute, and transmitting a job fetch request together with the input password information to the information processing apparatus, with use of the printing apparatus; receiving the job fetch request from the printing apparatus together with the password information input in accordance with the password attribute included in the attribute information, and verifying the received password information with a value of the password attribute included in the attribute information regarding the designated print job, with use of the information processing apparatus; transmitting the designated print job and the attribute information regarding the designated print job to the printing apparatus if the verification is successful, with use of the information processing apparatus; and performing printing using printing unit based on data regarding the print job if the print job has been received in response to the job fetch request, with use of the printing apparatus.

According to the present invention, print data can be efficiently transferred in the case of PIN printing.

Further features of the present invention will become apparent from the following description of exemplary embodiments with reference to the attached drawings.

BRIEF DESCRIPTION OF THE DRAWINGS

FIG. 4 shows a sequence of execution of PIN printing with a conventional technology.

FIG. 5 shows a sequence of execution of PIN printing according to the present embodiment.

FIG. 6 is an example of a flowchart in which the printing apparatus of the present embodiment fetches a print job.

FIG. 7 shows an example of a flowchart in which the cloud printing service of the present embodiment receives a print job fetch request.

FIG. 8 shows an example of an operation screen of the printing apparatus of the present embodiment.

FIGS. 9A to 9D show examples of packets transmitted when a print job is fetched according to the present embodiment.

FIG. 10 shows an example of a sequence of cloud printing with use of IPP.

DESCRIPTION OF THE EMBODIMENTS

Figure 1:
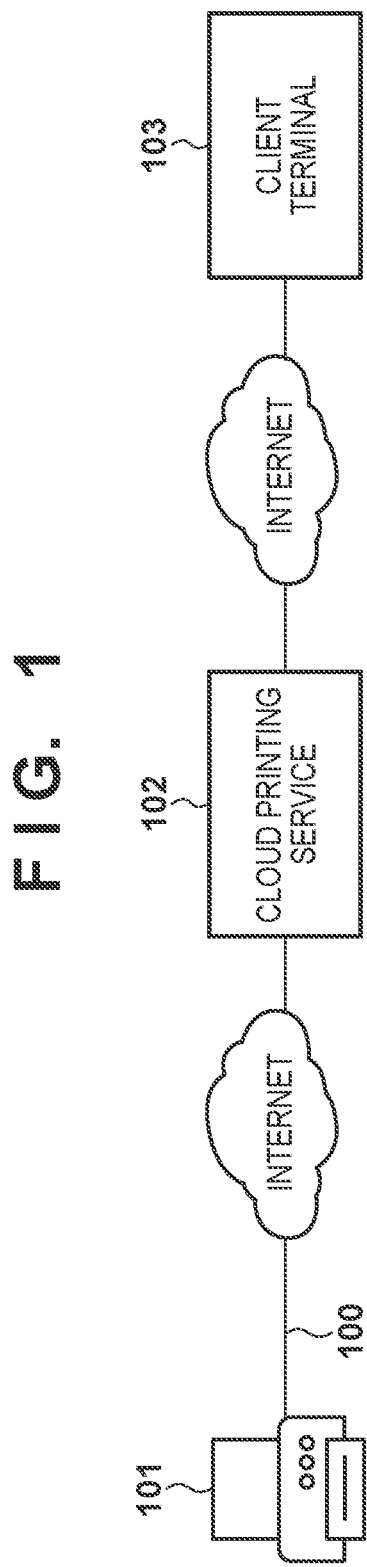
FIG. 1 shows an example of a printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

First, a configuration of a printing system according to the present invention will be described with reference to FIG. 1. The printing system according to the present embodiment includes a printing apparatus 101, a client terminal 103, and a cloud printing service (hereinafter, "CPS") 102. The printing apparatus 101 communicates with the CPS 102 on the internet via a network 100. For example, the network 100 may be a combination a communication network such as a LAN or a WAN, a cellular network (e.g. LTE, 5G etc.) and/or a wireless network conforming to IEEE802.11. That is, the network 100 need only be a network that enables transmission and reception of data, and may employ any physical-layer communication method.

The printing apparatus 101 has a scan function of transmitting data based on an image that is read using a scanner to an external device, a print function of printing an image on a sheet, such as paper, based on a print job received from an external device, and a copy function. The printing apparatus 101 can also receive a print job via the CPS 102 and perform printing. The present embodiment illustrates a Multi-Function Peripheral (MFP) that has a plurality of functions as an example of a printing apparatus, but the printing apparatus is not limited thereto. For example, the printing apparatus may be a Single-Function Periphera (SFPI) that only has a print function as its single function. Also, the present embodiment illustrates, as an example, printing on a sheet such as paper. However, the present invention is not limited thereto, and can also be applied to printing control in, for example, 3D printing for forming a three-dimensional object based on three-dimensional shape data. Note that the printing apparatus is also referred to as an image forming apparatus in some cases.

The CPS 102 receives a print job from a client terminal, such as the client terminal 103, and stores the print job. Next, the CPS 102 notifies the printing apparatus 101, which has been registered in the CPS 102, that a print job has been submitted. The printing apparatus 101 that has received the notification fetches the print job and executes print processing. The CPS 102 may be constituted by one or more information processing apparatuses. If the CPS 102 is constituted by a plurality of information processing apparatuses, functions such as user authentication and print data provision may be distributed, or the load of one function may be distributed, or a combination of these modes may be applied.

Hardware Configuration of Printing Apparatus 101

Figure 2:
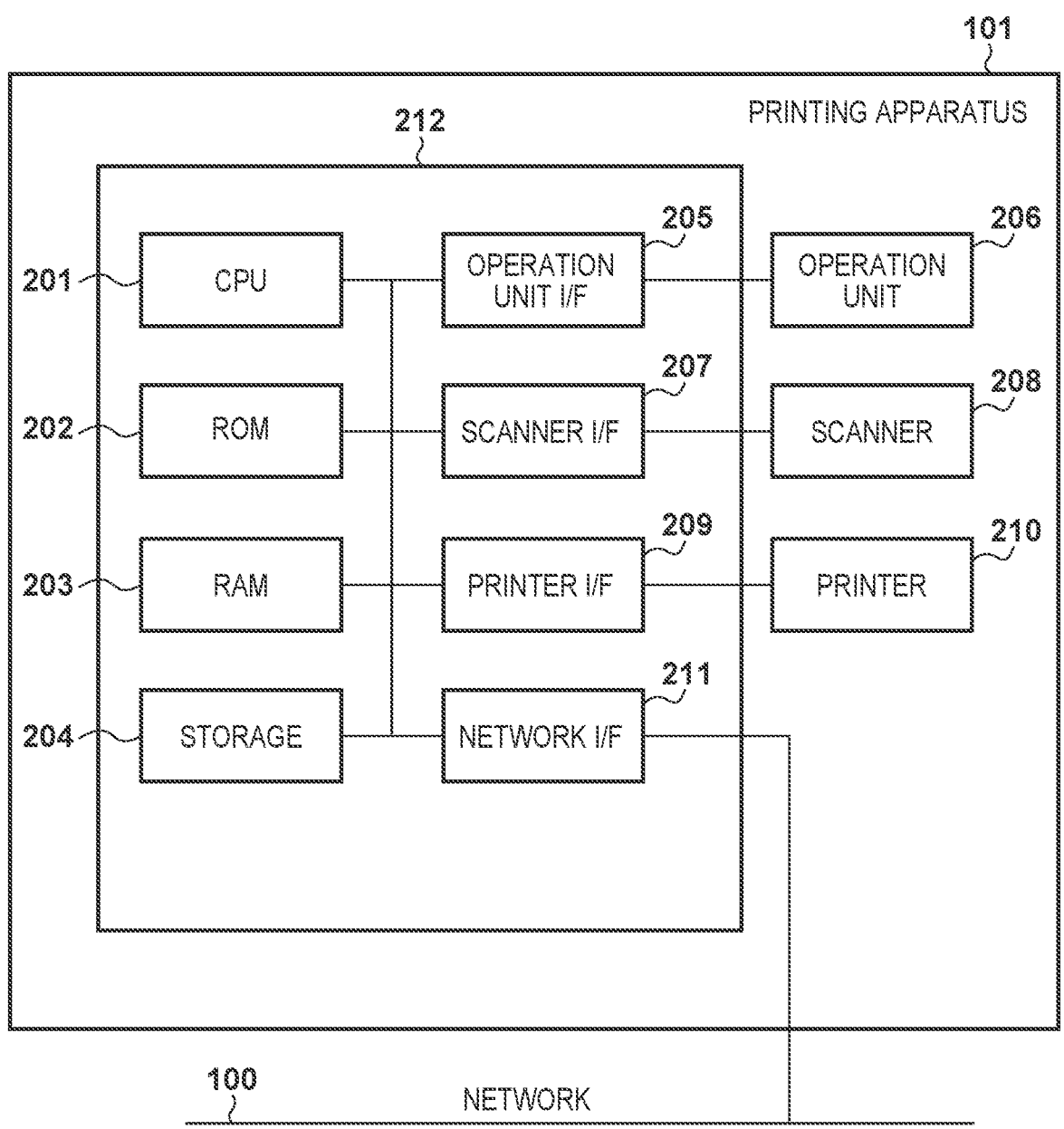
FIG. 2 shows an example of a hardware configuration of a printing apparatus.

A hardware configuration of the printing apparatus 101 of the present embodiment will be described with reference to FIG. 2. FIG. 2 is a block diagram showing the hardware configuration of the printing apparatus 101. The printing apparatus 101 has functions such as a readout function of reading an image on a sheet and a file transmission function of transmitting the read image to an external communication device. The printing apparatus 101 also has a print function of printing an image on a sheet. The printing apparatus 101 also has a function of receiving a print job from the CPS 102 and performing printing, a user management function, and a hold print function.

A Central Processing Unit (CPU) 201 controls operation of the entire printing apparatus 101. The CPU 201 loads and executes control programs stored in a Read Only Memory (ROM) 202 or a storage 204 and performs various types of control, such as print control and readout control. Control programs that can be executed by the CPU 201 are stored in the ROM 202. A Random Access Memory (RAM) 203 is a main storage memory accessed by the CPU 201 and is used as a work area or a temporary storage area for loading various control programs. Print jobs, image data, various programs, and various types of setting information are stored in the storage 204. Print jobs and other information downloaded from the CPS 102 are also stored in the storage 204. Hardware such as the CPU 201, the ROM 202, the RAM 203, and the storage 204 thus constitutes a computer.

Note that one CPU 201 in the printing apparatus 101 of the present embodiment executes various types of processing, which are shown in later-described flowcharts, with use of one memory (RAM 203), but any other mode may alternatively be employed. For example, the processing shown in the later-described flowcharts can also be executed by cooperation between a plurality of processors, memories, and storages. Further, a part of processing may also be executed with use of a hardware circuit.

A printer 210 prints an image on a sheet fed from a paper feed cassette (not shown), based on an input print image and a print control command. The printing method may be an electrophotographic method in which toner is transferred and fixed to paper, or may be an inkjet method in which printing is performed by ejecting ink to paper.

A scanner 208 reads an original placed on a platen (not shown) and generates image data. The image data generated by the scanner 206 is printed by the printer 210, stored in the storage 204, and/or transmitted to an external device via a network interface (I/F) 211.

An operation unit 206 includes a liquid-crystal display having a touch panel function, various hard keyboards, and the like. The operation unit 206 functions as a display unit for displaying information for a user and an accepting unit for accepting instructions from the user. That is, the operation unit 206 provides a user interface. The CPU 201 cooperates with the operation unit 206 to control display of information and accepting of user operation.

A network cable is connected to the network I/F 211, which enables communication with external devices on the network 100 and/or the internet. The present embodiment assumes that the network I/F 211 is a communication interface for wired communication conforming to Ethernet (registered trademark), but the network I/F 211 is not limited thereto. For example, the network I/F 211 may alternatively be a wireless communication interface conforming to the IEEE802.11 series. Alternatively, a communication interface for mobile communication with, for example, a 3G line such as CDMA, a 4G line such as LTE, or 5G NR may be applied.

The present embodiment illustrates the case where the printing apparatus 101 manages a database for managing user accounts, but the management of user accounts is not limited thereto. User accounts of users who use the printing apparatus 101 can also be managed by also using an external authentication server. For example, user accounts may be managed by using the Active Directory service or the Azure (registered trademark) Active Directory service provided by Microsoft (trademark).

Hardware Configuration of Cloud Printing Service 102

Figure 3:
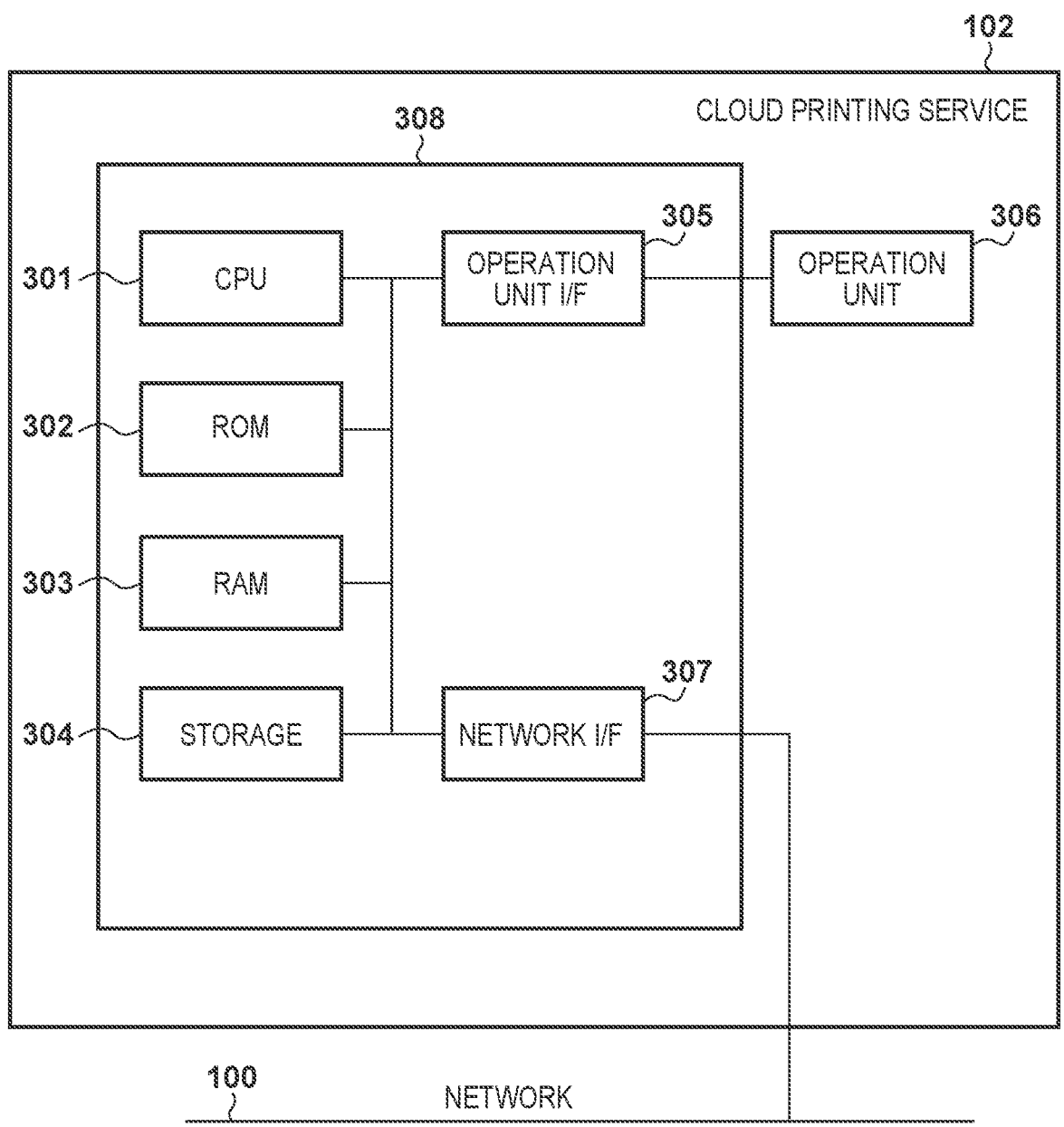
FIG. 3 shows an example of a hardware configuration of a cloud printing service.

A hardware configuration of the cloud printing service 102 of the present embodiment will be described with reference to FIG. 3. A CPU 301 to an operation unit 306 in FIG. 3 correspond respectively to the CPU 201 to the operation unit 206 in FIG. 2, and a network interface 307 corresponds to the network interface 211. Constituent elements in FIG. 3 are substantially the same as the constituent elements of the printing apparatus in FIG. 2, and a detailed description thereof is omitted. Note that the client terminal also has the same configuration as the configuration shown in FIG. 3.

Registration of Print Job

A procedure that enables printing with the printing system having the above configuration will be described. FIG. 10 is an example of a sequence diagram showing a mechanism of cloud printing using IPP, specifically a procedure for registering a printing apparatus and making the registered printing apparatus available from the client terminal.

First, the printing apparatus 101 is operated to transmit a printer registration request to the CPS 102 (S1001). The operation may be performed on the operation unit 206 of the printing apparatus 101, or may be performed using a remote UI provided to a computer or the like by the printing apparatus 101. Thereafter, the printing apparatus 101 notifies the CPS 102 of supported attribute information and attribute values by means of an Update-Output-Device-Attributes operation (S1002). The attribute values of the printing apparatus 101 are thus registered in the CPS 102. The attribute values of the printing apparatus 101 include whether or not PIN printing, which is a print job with a password, is supported, for example.

Thereafter, the printing apparatus subscribes to event notification from the CPS 102 by means of a Create-Printer-Subscription operation (S1003). After subscribing to the notification, the printing apparatus 101 checks whether or not an event has occurred by means of a Get-Notification operation (S1004). The CPS 102 thus notifies the printing apparatus 101 of an event upon occurrence of a new event, such as registration of a print job to be executed by the printing apparatus 101. Addition of a printing apparatus to the CPS 102 through the above procedure need only be performed prior to cloud printing using the printing apparatus 101.

Meanwhile, the client terminal 103 searches printing apparatuses registered in the CPS 102, and adds a printing apparatus selected from the found printing apparatuses as a printing apparatus to be used by the client terminal 103 (S1005). The client terminal 103 then fetches, from the CPS 102, attribute information and attribute values of the added printing apparatus by means of a Get-Printer-Attributes operation (S1006). The fetched attribute information and attribute values of the printing apparatus may be stored in association with the registered printing apparatus. Note that attribute information of printing apparatuses also includes a password attribute (PIN attribute), which indicates that a print job with a password, i.e. PIN printing is supported.

Thereafter, when executing printing, the client terminal 103 can select the printing apparatus added in steps S1005 and S1006 and perform printing using the selected printing apparatus. When printing is performed, if the printing apparatus selected by the client terminal 103 is the printing apparatus 101 registered in the CPS 102, the client terminal 103 displays a print setting screen in accordance with the fetched attribute information and transmits the print job together with set print attributes to the CPS 102. Note that attribute information regarding a printing apparatus is also called print settings in some cases.

PIN Printing in Cloud Printing Service

Next, conventional PIN printing in a cloud printing service will be described with reference to FIG. 4. FIG. 4 shows a sequence that realizes PIN printing using a CPS with a conventional technology. Here, an example of a CPS that uses IPP will be described. The sequence in FIG. 4 starts when the procedure ending in step S1006 in FIG. 10 has been completed and the printing apparatus 101 has become available from the client terminal 103. One of the fetched attributes of the printing apparatus 101 indicates that PIN printing is supported.

First, the user designates one file as a print target on the client terminal 103 and executes printing. Here, the user sets a PIN code and sets a password for print data. The client terminal 103 that has detected the execution of printing transmits print data and print attribute information, which includes PIN information, to the CPS 102 (S401). The print job is transmitted by means of a Print-Job operation or a Send-Document operation of IPP, for example. The PIN code is held by a Job-password-encryption or Job-password attribute, which is an IPP attribute. The CPS 102 that has received the print job from the client terminal 103 stores the print data and print attribute information received in step S402 in its storage. Although FIG. 4 shows a procedure in which event notification is not performed, if event notification is subscribed, and an event check has already been received, the CPS 102 may transmit, to the printing apparatus 101, an event notification indicating registration of a new print job to the printing apparatus 101.

Next, the user moves to the front of the printing apparatus 101 and selects "print job list screen display" on the operation screen of the printing apparatus 101 (S403). The "print job list screen display" is displayed as an item in a menu on an initial operation screen. Although an example where the user selects the "print job list screen display" is described here, other operations, such as logging in the printing apparatus and opening a job status screen, may also serve as triggers for the printing apparatus to transmit a job list fetch request. The printing apparatus 101 that has detected the print job list screen display request transmits a job list fetch request to the CPS 102 (S404). The job list fetch request is made by means of a Get-Jobs request operation of IPP, for example.

In step S405, the CPS 102 that has received the job list fetch request transmits print job list information addressed to the printing apparatus 101. The job list information only includes typical print attribute information necessary for displaying a job list, such as job names and job owner names.

In step S406, the printing apparatus 101 that has fetched the job list information displays the fetched job list information on the operation screen. FIG. 8 shows an example of a job list screen 801. In step S407, the user selects one job to be printed from the job list. In step S408, the printing apparatus 101 that has detected the selection of a job transmits, to the CPS 102, a print job fetch request with designation of the selected print job. The job fetch request is made by means of a Fetch-Job or Fetch-Document operation of IPP. FIG. 9A shows this example.

In step S409, the CPS 102 that has received the print job fetch request transmits, to the printing apparatus 101, corresponding print job data and all print attribute information. After completing reception of all of the print data, in step S410, the printing apparatus 101 transmits a print data fetch completion notification to the CPS 102.

The printing apparatus 101 determines that a PIN has been set for the print data due to the received print attribute information including a Job-password attribute or the like. Therefore, in step S411, the printing apparatus 101 displays a PIN input screen 804 shown in FIG. 8 on the operation screen. In step S412, the printing apparatus 101 detects input of a PIN code by the user, and in step S413, the printing apparatus 101 checks the value of the input PIN code with the value of the PIN code received from the CPS 102 and verifies whether or not these values match. If the verification result is a success, in step S414, the printing apparatus 101 executes processing to print the print job. The printing apparatus 101 displays a printing-in-progress screen 802 during print processing, and displays a print completion screen 803 after the printing has finished. On the other hand, if the verification result is a failure, in step S415, the printing apparatus 101 does not execute print processing, and displays a verification failure screen 805 shown in FIG. 8. In step S416, the printing apparatus 101 notifies the CPS 102 of a job status including a notification indicating a success if printing has been successfully performed, or a notification indicating a failure if printing has failed. The job status notification is given by means of an Update-Job-States operation of IPP, for example.

As described above, the printing apparatus 101 receives all of the print data in step S409 even if the PIN code verification fails. This leads to a problem in that traffic for print data that is not printed will be wasted. A wasteful communication fee will be charged in the case of a pay-as-you-go cloud service.

Sequence of Transmitting and Receiving Print Job According to First Embodiment

Next, a sequence of PIN printing according to the present embodiment will be described with reference to FIGS. 5 and 9A to 9D.

First, the overall sequence according to the present embodiment will be described with reference to FIG. 5. The flow in steps S501 to S507 is the same as that in steps S401 to S407 in FIG. 4. Note that there are cases where the print job received in step S501 includes a set PIN code as a job attribute. In such cases, in step S502, the PIN code is also stored (registered) as a job attribute. Here, the CPS 102 may determine whether or not the attributes of the printing apparatus include a PIN attribute indicating that PIN printing is supported, and may store the received PIN attribute only if the PIN attribute is included. Thereafter, the printing apparatus 101 transmits, to the CPS 102, a job attribute fetch request for the job selected in step S507 (S508).

The CPS 102 then transmits, to the printing apparatus 101, job attributes in response to the job attribute fetch request (S509). The job attributes include a PIN attribute if a PIN has been set for a target print job, and the job attributes do not include a PIN attribute if a PIN has not been set for the target print job. Thus, whether or not a PIN has been set can be determined based on the job attributes. FIG. 9C shows an example of a job fetch response packet. For example, the operation of this job fetch response packet is "Fetch-Job Attribute Response", and a job attribute fetch response packet may be a packet obtained by excluding a Payload portion therefrom. Note that the configuration obtained by excluding the Payload portion from FIG. 9C does not include a PIN attribute. In the case where a PIN attribute is included, for example, a Job-password attribute and a Job-password-encryption attribute shown in FIG. 9B are also included. Note that the Job-password attribute includes a PIN code as its value, but the job attribute fetch response need only indicate that a PIN has been set, and therefore need not include a PIN code. Note that there are cases where a PIN is called password information or authentication information, and a PIN attribute is called a password attribute or an authentication information attribute. There are also cases where password information includes not only a password itself but also an encrypted password. An encrypted password includes a hash value of the password.

If the received job attributes include a PIN attribute, the printing apparatus 101 displays the PIN input screen 804 shown in FIG. 8 and requires the user to input a PIN code (S510). The printing apparatus 101 then transmits, to the CPS 102, the PIN code that has been input by the user in step S511 and a print job fetch request (S512). FIG. 9B shows a job fetch request as an example of a packet transmitted at this time. This packet include not only an indication that this packet is a job fetch request and a job ID, but also IPP attributes that are a Job-password-encryption attribute and an attribute value thereof, as well as a Job-password attribute and an attribute value thereof. The attribute value of the Job-password-encryption attribute indicates an encryption method (hash function), and the attribute value of the Job-password attribute indicates the input PIN code.

The CPS 102 checks the received PIN code with the PIN code of the job stored in its storage to verify the received PIN code (S513). Note that if a hash function is applied to the PIN code, the hash value of the PIN code is checked. If the verification result indicates that the PIN codes do not match, the CPS 102 transmits a job fetch error shown in FIG. 9D to the printing apparatus 101 (S514). This message indicates that the job fetch request has failed. The printing apparatus 101 then displays a printing error message as in a PIN verification failure screen 805 shown in FIG. 8 (S515). If the PIN codes match, the CPS 102 transmits, to the printing apparatus 101, job data from which the PIN attribute has been deleted that is shown in FIG. 9C (S516). This message indicates that the job fetch request has been successful, and includes the job attributes excluding the PIN attribute and the print data.

The printing apparatus 101 then performs print processing (S517), displays a message that printing has been completed (S518), and transmits a completion notification to the CPS 102 (S519).

Processing Procedure Performed by Printing Apparatus

Next, specific control executed by the printing apparatus 101 to realize processing illustrated in the sequence diagram in FIG. 5 will be described with reference to the flowchart in FIG. 6. Steps in the flowchart in FIG. 6 indicate processing realized by the CPU 201 of the printing apparatus 101 executing a program loaded to the RAM 203.

The CPU 201 detects, via the operation unit 206, a job selection made by an operation of the user (S601). Next, the CPU 201 transmits a job attribute fetch request for the detected job to the CPS 102 (S602). Next, the CPU 201 receives the requested job attributes from the CPS 102 (S603). The CPU 201 determines whether or not the received job attributes include a PIN attribute (S604).

If it is determined in step S604 that a PIN attribute is not included, the CPU 201 transmits a job fetch request to the CPS 102 (S605). If the result of the request in step S605 is a success (S606), the CPU 201 receives job data from the CPS 102 (S607). After completing reception, the CPU 201 transmits a completion notification to the CPS 102 (S608). Next, the CPU 201 performs print processing (S609), displays the successful result on the operation unit 206 (S610), and transmits a completion notification to the CPS 102 (S611). If the result of the request in step S605 is a failure (S606), the CPU 201 displays an error result on the operation unit 206 (S615).

On the other hand, if, in step S604, a PIN attribute is included, the CPU 201 displays the PIN input screen on the operation unit 206 (S612). The CPU 201 then detects input of a PIN (S613) and adds detected PIN information to the job fetch request made in step S605 (S614). The processing then advances to step S605.

Processing Procedure Performed by CPS

Next, specific control executed by the CPS 102 to realize processing illustrated in the sequence diagram in FIG. 5 will be described with reference to the flowchart in FIG. 7. Steps in the flowchart in FIG. 7 indicate processing realized by the CPU 301 of the CPS 102 executing a program loaded to the RAM 303.

The CPU 301 receives the job fetch request made in step S605 (S701). Next, the CPU 301 determines whether or not the received attributes include a PIN attribute (S702).

If, in step S702, the PIN attribute is not included, the CPU 301 transmits a job fetch success response to the printing apparatus 101 (S703). The success response is as shown in FIG. 9C, and includes attributes, settings, and print data of the target print job.

If, in step S702, a PIN attribute is included, the CPU 301 verifies the received PIN code with the PIN code of the job stored in the storage of the CPS 102 (S704).

If, in step S704, the PIN codes match, the CPU 301 deletes the PIN attribute from the job attributes of the target job stored in the storage (S705). The processing then advances to step S703.

If, in step S704, the PIN codes do not match, the CPU 301 transmits a job fetch error response to the printing apparatus 101 (S706). The job fetch error response is as shown in FIG. 9D, and includes a status code indicating a failure of job fetch.

As a result of the cloud printing service thus verifying a print job for which PIN information has been set, it is possible to reduce the communication fee charged to transmit print data to the printing apparatus when the verification failed.

Variations

In the above embodiment, the PIN code input from the operation unit of the printing apparatus 101 is transmitted to the CPS 102 and verified thereby. In contrast, if the job attributes transmitted from the CPS 102 to the printing apparatus 101 in step S509 include a PIN code, or an encryption method and an encrypted PIN code, the printing apparatus 101 can verify the PIN code. In this case, if the verification is successful, the printing apparatus 101 may transmit a job fetch request to the CPS 102, and the CPS 102 may transmit job information (print data and print attributes) to the printing apparatus in response to the request. Further, in this case, the printing apparatus 101 may also add information indicating that the verification has been successful to the job fetch request and transmit this request to the CPS 102. In this case, if a PIN has been set for the target print job, the CPS 102 may transmit print job and print attributes only for job fetch requests indicating that the verification has been successful. This configuration can also eliminate the need to transfer print data when PIN verification failed.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-093819, filed Jun. 9, 2022 which is hereby incorporated by reference herein in its entirety.

What is claimed is:

1. An information processing apparatus comprising:
at least one memory that stores at least one program, and
at least one processor, wherein the at least one program causes the at least one processor to perform operations including:
transmitting, to a printing apparatus, attribute information regarding a designated print job, out of at least one print job registered together with attribute information, in response to a request, from the printing apparatus, for the attribute information regarding the designated print job;
receiving a job fetch request from the printing apparatus together with password information input to the printing apparatus in accordance with a password attribute included in the attribute information;
verifying the received password information with a value of the password attribute included in the attribute information regarding the designated print job; and
transmitting the designated print job and the attribute information regarding the designated print job to the printing apparatus if the verification performed by the verifying is successful.

2. The information processing apparatus according to claim 1,
wherein the attribute information transmitted does not include the password attribute.

3. The information processing apparatus according to claim 1,
wherein the attribute information is transmitted without including the password attribute.

4. The information processing apparatus according to claim 1,
wherein if the verification of the password information fails, information indicating a failure is transmitted to the printing apparatus.

5. The information processing apparatus according to claim 1, wherein the at least one program further causes the at least one processor to perform operations including:
receiving a print job transmitted from a terminal and registering the received print job together with the attribute information regarding the print job,
wherein if the attribute information includes the password attribute, the password attribute is registered.

6. The information processing apparatus according to claim 5, wherein the at least one program further causes the at least one processor to perform operations including:
registering the attribute information regarding the printing apparatus in response to a request, from the printing apparatus, to register the printing apparatus,
wherein if the attribute information regarding the print job received from the terminal includes an attribute that the printing apparatus supports a print job with a password, the password attribute included in the attribute information is registered.

7. The information processing apparatus according to claim 1, wherein the at least one program further causes the at least one processor to perform operations including:
 transmitting, to the printing apparatus, job list information indicating a list of the registered print job, in response to a job list fetch request from the printing apparatus.

8. A printing apparatus comprising:
 at least one memory that stores at least one program, and
 at least one processor, wherein the at least one program causes the at least one processor to perform operations including:
 transmitting, to an information processing apparatus, a request for attribute information regarding a print job designated from at least one print job registered in the information processing apparatus;
 accepting input of password information that is made by a user if attribute information transmitted in response to the request for the attribute information includes a password attribute; and
 transmitting, to the information processing apparatus, a job fetch request together with the input password information if the password attribute has been received for the designated print job,
 wherein if a print job is received in response to the job fetch request transmitted together with the password information, printing is performed by a printing unit based on data regarding the print job.

9. The printing apparatus according to claim 8, wherein the at least one program further causes the at least one processor to perform operations including:
 transmitting, to the information processing apparatus, a job list fetch request for a list of the print job registered in the information processing apparatus,
 wherein a request for attribute information regarding a print job designated from job list information fetched in response to the job list fetch request is transmitted.

10. The printing apparatus according to claim 8,
 wherein if information is received that indicates that verification of the password information has failed for the job fetch request transmitted together with the password information, the received information is output.

11. A printing system comprising:
 the information processing apparatus; and
 the printing apparatus, wherein
 the information processing apparatus comprises:
 at least one memory that stores at least one first program, and
 at least one first processor, wherein the at least one first program causes the at least one first processor to perform operations including:
 transmitting, to a printing apparatus, attribute information regarding a designated print job, out of at least one print job registered together with attribute information, in response to a request, from the printing apparatus, for the attribute information regarding the designated print job;
 receiving a job fetch request from the printing apparatus together with password information input to the printing apparatus in accordance with a password attribute included in the attribute information;
 verifying the received password information with a value of the password attribute included in the attribute information regarding the designated print job; and
 transmitting the designated print job and the attribute information regarding the designated print job to the printing apparatus if the verification is successful, and the printing apparatus comprises:
 at least one memory that stores at least one second program, and
 at least one second processor, wherein the at least one second program causes the at least one second processor to perform operations including:
 transmitting, to an information processing apparatus, a request for attribute information regarding a print job designated from at least one print job registered in the information processing apparatus;
 accepting input of password information that is made by a user if attribute information transmitted in response to the request for the attribute information includes a password attribute; and
 transmitting, to the information processing apparatus, a job fetch request together with the input password information if the password attribute has been received for the designated print job,
 wherein if a print job is received in response to the job fetch request transmitted together with the password information, printing is performed by a printing unit based on data regarding the print job.

12. A non-transitory computer readable medium storing thereon a program which, when loaded into a computer and executed, causes the computer to execute a process, the process comprising:
 transmitting, to a printing apparatus, attribute information regarding a designated print job, out of at least one print job registered together with attribute information, in response to a request, from the printing apparatus, for the attribute information regarding the designated print job;
 receiving a job fetch request from the printing apparatus together with password information input to the printing apparatus in accordance with a password attribute included in the attribute information;
 verifying the received password information with a value of the password attribute included in the attribute information regarding the designated print job; and
 transmitting the designated print job and the attribute information regarding the designated print job to the printing apparatus if the verification is successful.

13. A non-transitory computer readable medium storing thereon a program which, when loaded into a computer and executed, causes the computer to execute a process, the process comprising:
 transmitting, to an information processing apparatus, a request for attribute information regarding a print job designated from at least one print job registered in the information processing apparatus;
 accepting input of password information that is made by a user if attribute information transmitted in response to the request for the attribute information includes a password attribute; and
 transmitting, to the information processing apparatus, a job fetch request together with the input password information if the password attribute has been received for the designated print job,
 wherein if a print job is received in response to the job fetch request transmitted together with the password information, printing is performed by a printing unit based on data regarding the print job.

14. A printing control method to be performed by a printing system that includes an information processing apparatus, a printing apparatus, and a terminal, the method comprising:

transmitting, to the information processing apparatus, a request for attribute information regarding a print job designated from at least one print job registered in the information processing apparatus, with use of the printing apparatus;

transmitting the attribute information regarding the designated print job to the printing apparatus in response to the request for the attribute information, with use of the information processing apparatus;

accepting input of password information that is made by a user if the attribute information transmitted in response to the request for the attribute information includes a password attribute, and transmitting a job fetch request together with the input password information to the information processing apparatus, with use of the printing apparatus;

receiving the job fetch request from the printing apparatus together with the password information input in accordance with the password attribute included in the attribute information, and verifying the received password information with a value of the password attribute included in the attribute information regarding the designated print job, with use of the information processing apparatus;

transmitting the designated print job and the attribute information regarding the designated print job to the printing apparatus if the verification is successful, with use of the information processing apparatus; and performing printing using printing unit based on data regarding the print job if the print job has been received in response to the job fetch request, with use of the printing apparatus.

* * * * *